May 12, 1970     R. A. WITTREN     3,511,134
POSITION-RESPONSIVE CONTROL SYSTEM FOR HYDRAULIC ACTUATORS
Filed Jan. 15, 1968     2 Sheets-Sheet 1

INVENTOR.
RICHARD A. WITTREN

BY

AGENT

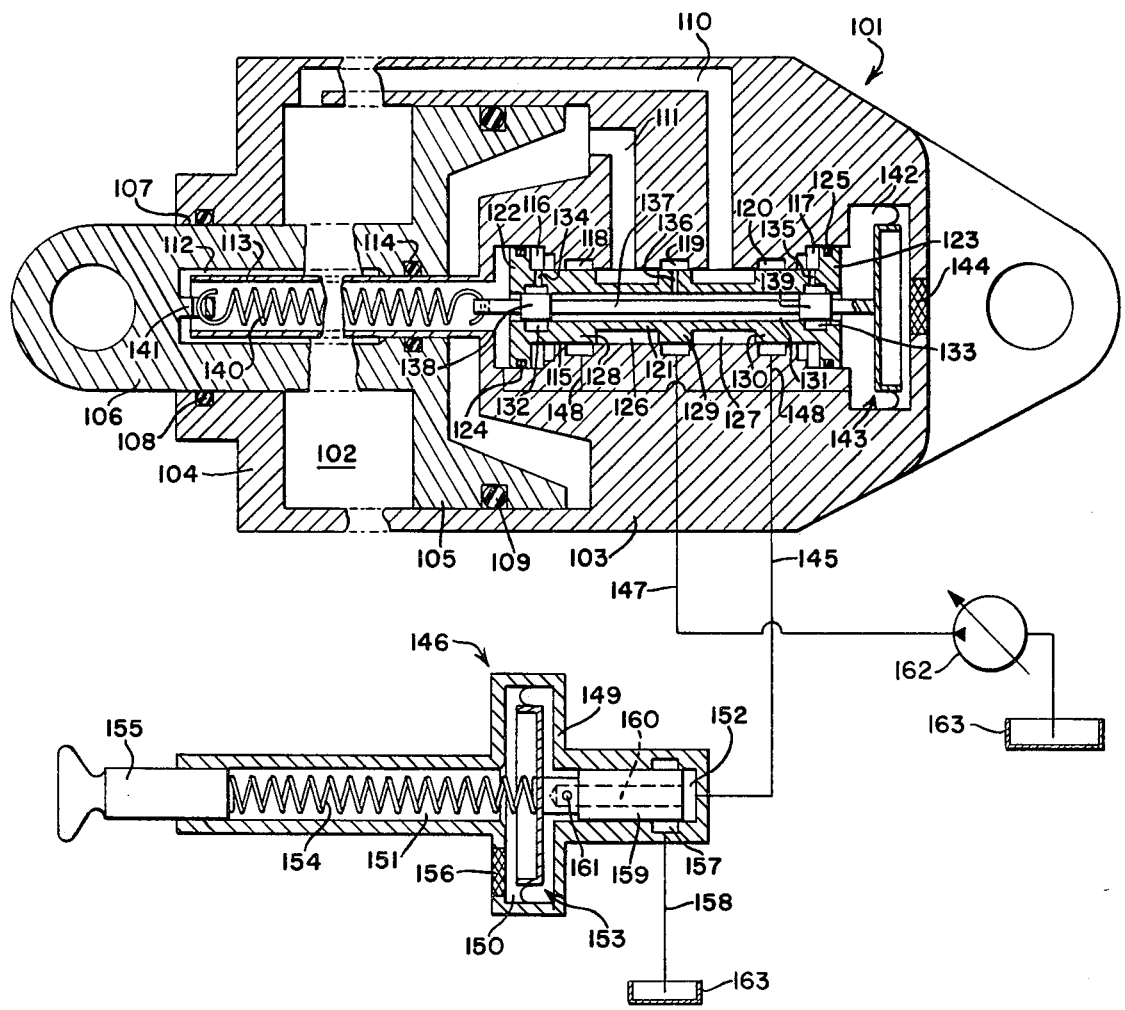

United States Patent Office 3,511,134
Patented May 12, 1970

3,511,134
POSITION-RESPONSIVE CONTROL SYSTEM FOR HYDRAULIC ACTUATORS
Richard Arthur Wittren, Cedar Falls, Iowa, assignor to Deere & Company, Moline, Ill., a corporation of Delaware
Filed Jan. 15, 1968, Ser. No. 697,933
Int. Cl. F15b 13/16
U.S. Cl. 91—387        11 Claims

ABSTRACT OF THE DISCLOSURE

A control system for a hydraulic actuator in which a spool valve controls the supply of fluid to and exhaust of fluid from the actuator. Fluid pressure in a control circuit exerts a force on the spool valve to urge it in one direction while a feedback mechanism in the form of a spring provides an opposite force. When the two forces are equal, the valve settles in its neutral position. A pressure regulating valve which is manually operated controls the pressure in the control circuit. Any change in pressure in the control circuit moves the spool valve from its neutral position causing movement of the actuator rod until the force exerted by the feedback mechanism moves the spool valve back to its neutral position.

BACKGROUND OF THE INVENTION

This invention relates generally to control systems for remote hydraulic actuators and more particularly to position-responsive control systems which operate on a force-balance principle and utilize a mechanical feedback.

Various position-responsive control systems for hydraulic actuators have been known and used, but have had numerous disadvantages. Many of the known position-responsive control systems have been extremely complicated with the result that their use was not economically feasible. Other known position-responsive control systems lack the accuracy needed for many applications. Still others of the known position-responsive control systems are subject to creep or slippage. The control system of the present invention overcomes all of the above shortcomings which are present in the position-responsive control systems in use at the present time.

SUMMARY OF THE INVENTION

The main objects of the present invention are to provide an improved position-responsive control system which is of simple construction, is extremely accurate over the full actuator stroke, and is free from creep, slippage or leakage.

The above objects are accomplished by providing a pressure sensing component which operates a balanced valve when acted upon by a control signal pressure. For a double acting actuator, a four-way control valve is utilized and supplies line pressure to each side of the actuator. A feedback mechanism transmits the position of the actuator piston rod to the pressure sensing component. The pressure sensing component receives the control signal pressure from a control circuit, and the pressure in the control circuit is controlled by a manually operable pressure regulating valve. When the balanced valve is opened by the action of the control pressure on the pressure sensing component, the actuator piston and piston rod move until the feedback mechanism closes the valve indicating that the piston and piston rod have reached the position called for by the control pressure.

An additional advantage of the position-responsive control system according to the present invention is that it possesses a homing characteristic which makes the final position of the piston and piston rod insensitive to any line restrictions or system back pressure. The homing characteristic is inherent in the system according to the present invention because the system is not satisfied until the force provided by the control pressure and the force provided by the feedback mechanism are equal.

Further objects and advantages will appear to those skilled in the art from a reading of the following description when read in conjunction with the accompanying drawing.

BRIEF DESCRIPTION OF THE DRAWINGS

In the drawings:

FIG. 2 is a view similar to FIG. 1, but illustrating a slightly modified form of control system according to the present invention.

DESCRIPTION OF THE PREFERRED EMBODIMENTS

Figure 1:
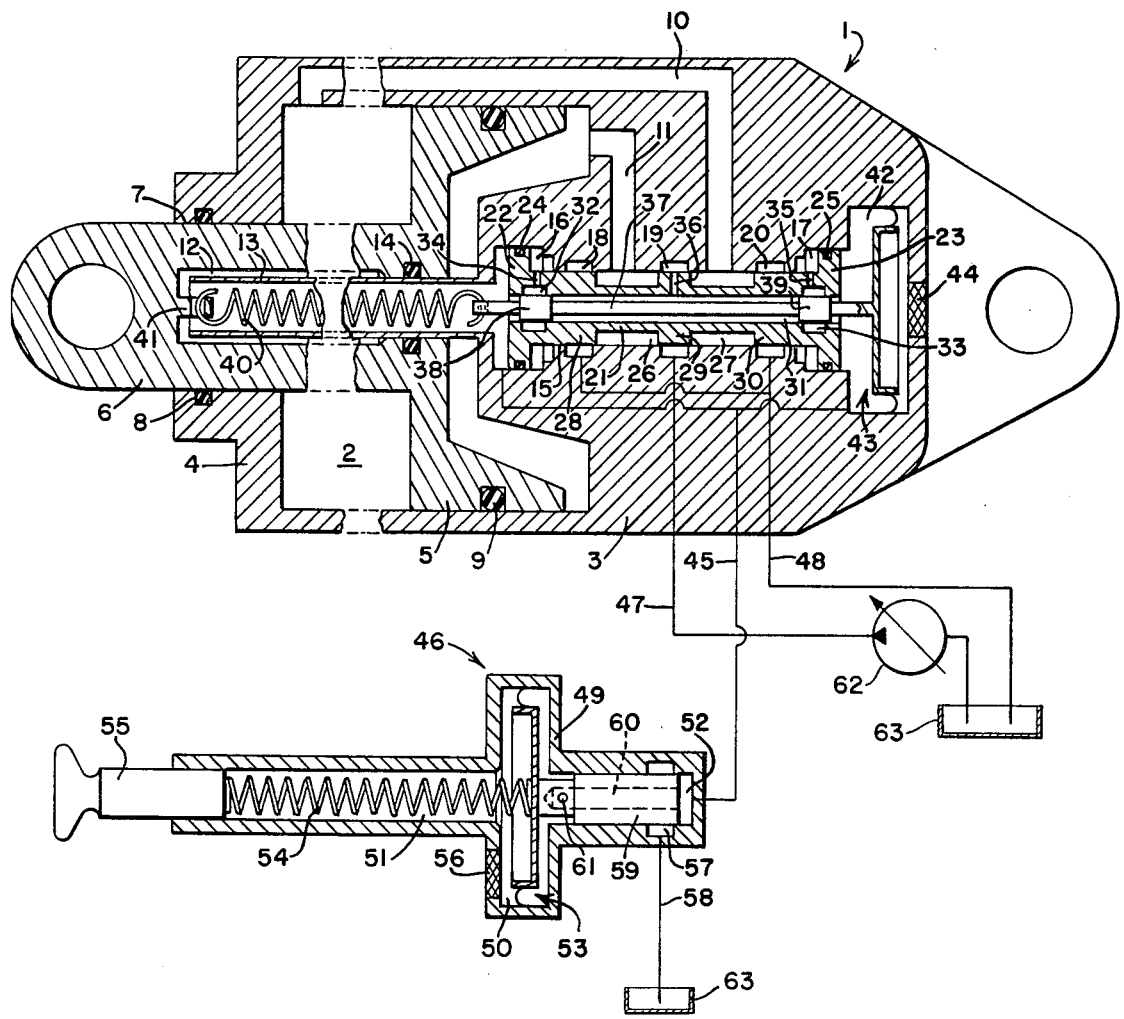
FIG. 1 is a cross sectional view of a hydraulic actuator in which a position-responsive control system according to the present invention has been incorporated.

Referring now to the drawings, and in particular to FIG. 1, a hydraulic actuator is indicated generally by the numeral 1. The actuator 1 has two main components, chamber 2 and valve housing 3. The chamber 2 is closed at one end by the valve housing 3, and at the other end by end wall 4. A piston 5 is slidably received within the chamber 2 and includes piston rod 6 which extends through an opening 7 in the end wall 4. A seal 8 surrounds the piston rod and prevents loss of hydraulic fluid by leakage between the piston rod and the wall of opening 7 while a seal 9 surrounds the piston 5 and prevents the flow of any fluid between the cylinder wall and the piston. Hydraulic fluid is supplied to and exhausted from the chamber 2 on the rod side of the piston by chamber passage 10 and on the back side of the piston by chamber passage 11.

A bore 12 extends through the piston 5 and into the piston rod 6 where it terminates just short of the free end of the rod. A tubular extension 13 of the valve housing 3 extends into the chamber 2 and bore 12, and is of a length to remain within the bore 12 when the piston rod is in its fully extended position. A seal 14 surrounds the extension 13 and prevents leakage of fluid from the chamber 2 into the bore 12.

A valve bore or chamber 15 extends through the valve housing 3 in alignment with the tubular extension 13 and is in communication therewith. The ends of bore 15 are provided with large annular grooves forming valve chambers 16 and 17 while three smaller annular grooves are spaced along the length of the bore 15 and form ports 18, 19, and 20. As will be more apparent later, the port 19 is a pressure port while the ports 18 and 20 are exhaust ports. The chamber passage 10 communicates with the bore 15 midway between ports 19 and 20 while the chamber passage 11 communicates with the bore 15 midway between the ports 18 and 19.

A main valve 21 is freely slidable within the bore 15 and is of a length to extend from chamber 16 to chamber 17. The ends of the main valve 21 are enlarged as at 22 and 23 to slidably engage the peripheral walls of the chambers 16 and 17 and to limit the lengthwise movement of the valve. Seals 24 and 25 surround the enlarged ends 22 and 23, respectively, to prevent the passage of fluid from one side of an enlarged end to the other side. The main valve 21 is provided with two annular grooves 26 and 27 which form lands 28, 29, and 30. When the main valve 21 is in a centered or neutral position, the lands 28, 29, and 30 close off the ports 18, 19, and 20, respectively, while the grooves 26 and 27 are positioned over the points of communication of the bore 15 with cylinder passages 11 and 10, respectively.

A pilot valve bore 31 extends through the main valve 21 and is provided with an annular groove adjacent each end forming ports 32 and 33. A small radial passageway 34 extends from the port 32 to the outer surface of the main valve 21 where it communicates with the chamber 16, and a similar radial passageway 35 extends from the port 33 to the outer surface of main valve 21 where it communicates with the chamber 17. A third radial passageway 36 extends from the bore 31 through the land 29 and, due to the limited movement of the main valve 21, is always in communication with the pressure port 19. A pilot valve 37 extends through the bore 31 and beyond each end of the main valve 21. The pilot valve 37 is substantially smaller than the bore 31, but is provided with lands 38 and 39 which substantially close off the ports 32 and 33 when the pilot valve is in a central or neutral position.

The pilot valve 37 is urged to the left by a tension spring 40 which has one end secured to the pilot valve and the other end secured to a lug 41 located at the end of bore 12. The right-hand end of the pilot valve extends into a low pressure chamber 42 where it is secured to a low friction diaphragm indicated generally at 43 which divides the chamber 42 into two parts. The left side of chamber 42 is normally filled with fluid under moderately low pressure which acts against the diaphragm to overcome the force of the spring 40, and the right side of the chamber 42 is vented to atmospheric pressure by the breather cap 44. A pilot circuit 45 establishes communication between the left side of the chamber 42 and the chamber 16 at the left side of the enlarged end of the main valve 21, and also communicates with a control valve or pressure regulating valve indicated generally at 46. Together the pilot circuit 45 and the left sides of the chambers 42 and 16 form a control circuit for the pilot valve. The control valve regulates the pressure in the control circuit, and hence the pressure of the fluid acting on diaphragm 43.

To complete the hydraulic cylinder, fluid from a source of fluid pressure 62 is supplied to the pressure port 19 by way of a conduit 47, and fluid is exhausted from the ports 18 and 20 to a sump or reservoir 63 by way of conduit 48.

The control valve 46 includes a housing 49 having a chamber 50 and bores 51 and 52 extending from each side of the chamber. A low friction diaphragm, indicated generally at 53, is mounted within the chamber 50 and divides the chamber into two parts. A compression spring 54 in the bore 51 acts against the left face of the diaphragm and urges it toward the right side of chamber 50. The force of the spring 54 is controlled by a manual control plunger 55 which compresses the spring 54 as it is moved into the bore 51. The spring 54 is calibrated with respect to spring 40 so that a certain movement of the plunger 55 will result in a predetermined movement of the piston 5 and piston rod 6 in a manner which will be more apparent from a reading of the description of operation. The chamber 50 is vented to atmospheric pressure on the spring side of diaphragm 53 by the breather cap 56.

The pilot circuit 45 communicates with the control valve 46 at the outer end of the bore 52 and an annular groove adjacent the outer end of the bore 52 forms a port 57 which is in communication with the sump 63 by way of a conduit 58. A valve 59 in the bore 52 is secured to the diaphragm 53, is slidable within the bore 52, and normally covers the port 57. The valve 59 is provided with an axial bore 60 which extends from the free end thereof to a point adjacent the diaphragm where a radial passageway 61 provides communication between the bore 60 and chamber 50 so that fluid from the pilot circuit 45 is free to pass through the bore 60 and radial passageway 61 to the chamber 53.

In order to understand the operation of the position-responsive control system described above, it must be kept in mind that the system is built to provide a certain amount of leakage which will be referred to as controlled leakage. The controlled leakage which is necessary in the embodiment just described occurs across the lands 38 and 39 on the pilot valve 37 and across the valve 59. The controlled leakage keeps the control circuit charged with fluid at a pressure determined by the control valve. If desired, the various components can be made with closer tolerances and the controlled leakage provided by small bores through the lands 38 and 39 or by a connecting orifice between the supply conduit 47 and the pilot circuit 45.

The operation of the position-responsive control system illustrated in FIG. 1 is as follows. After the system has been shut down for some time, the fluid pressure in the pilot circuit 45 and the left side of chamber 42 will drop due to the controlled leakage across the valve 59. As the pressure in chamber 42 drops, the pilot valve 37 will be moved to the left under the force of spring 40. The system will remain in this condition until supplied with fluid pressure. When fluid pressure is supplied to the conduit 47, it flows into the pressure port 19 through radial passageway 36, into the bore 31 and port 32, through the radial passageway 34, and into the chamber 16. The fluid pressure in chamber 16 will move the main valve 21 to the left. With the main valve 21 shifted to the left, the fluid from the supply conduit 47 is free to flow through pressure port 19 to the groove 27 and into the chamber passage 10 which directs the fluid to the rod side of the piston 5. During this time the controlled leakage across the lands 38 and 39 is pressurizing the chamber 42 and the pressure on the diaphragm 43 begins to overcome the force of the spring 40 and moves the pilot valve 37 back toward the right. As the pilot valve is shifted to the right, it carries the main valve 21 with it by pressurizing the chamber 17. This has the effect of moving the valves to their neutral position and the system will come to rest with all the parts in the positions illustrated.

If the plunger 55 is moved to the right, the spring 54 will exert a larger force on the diaphragm 53 which in turn causes an increase in the regulated pressure in the control circuit. The increase in the regulated pressure acts on the diaphragm 43 to shift the pilot valve to the right. The pilot valve again carries the main valve 21 with it by pressurizing the chamber 17. The movement of the main valve opens the port 19 to the cylinder passage 11 so that the fluid pressure enters the chamber 2 on the back side of the piston 5 and extends the rod 6. The valves remain in this position until sufficient movement of the piston 5 and piston rod 6 occurs to provide the required spring force to bring the diaphragm back into a balanced force condition at the neutral valve position. By having the springs 40 and 54 calibrated with each other, the operator will know exactly how much movement of plunger 55 is required to move the piston rod 6 the desired amount. If the plunger 55 is moved to the left, the opposite sequence of events occurs and the piston rod 6 is retracted.

A second embodiment of the control system of the present invention is illustrated in FIG. 2 and is identical to the system illustrated in FIG. 1 except for the pilot circuit and the exhaust conduit. The various parts of the system illustrated in FIG. 2 are designated by numbers which are 100 higher than the numbers used to designate the corresponding parts of the system illustrated in FIG. 1 so that the FIG. 2 system will not have to be completely described.

In FIG. 2, the exhaust ports 118 and 120 drain into conduits 148 which are in communication with the pilot circuit 145. In this embodiment, all of the fluid exhausted from the chamber 102 flows through the pilot circuit and control valve 146 so that a separate exhaust line is not needed. This system is well suited when the cylinder must be used some distance from the sump in that it eliminates one of the hydraulic lines which must extend to the cylinder.

What is claimed is:

1. In a hydraulic system including a fluid pressure source and a fluid motor, a position-responsive control comprising: main valve means connected between the source and motor and including a valve member selectively actively and neutrally positionable and having a pair of opposed fluid pressure receivable servo areas, passage means connecting the areas to the fluid pressure source, pilot valve means controlling said passage means and selectively movable to either side of a neutral position to pressurize the respective main valve areas, a control circuit including a pressure sensing means acting on the pilot valve means, and a control means for varying the pressure in the control circuit to move the pilot valve means out of its neutral position and thereby pressurize a selected one of the main valve areas so as to actively position the main valve member, a feedback mechanism associated with a movable part of said fluid motor and including a biasing means acting on said pilot valve means in opposition to said pressure sensing means to move said pilot valve means back to its original position when the forces from said pressure sensing means and said biasing means are in equilibrium and thereby neutrally position said main valve member by pressurizing the other of said main valve areas.

2. A position-responsive control as set forth in claim 1 wherein said main valve means is a spool valve, said passage means including a bore extending through said valve member and passages connecting said bore and said main valve areas, and said pilot valve means is located within said bore and closes off said passages when in its neutral position.

3. A position-responsive control as set forth in claim 2 wherein said pilot valve means is operative to exhaust the fluid from a selected one of said main valve areas into said control circuit as the other main valve area is being pressurized.

4. A position-responsive control system as set forth in claim 3 wherein said pilot valve means has a central balanced position which it assumes when said forces are in equilibrium and has a neutral position with respect to said main valve member which is independent of said central balanced position.

5. A position-responsive control as set forth in claim 1 wherein said pilot valve means includes means for the passage of fluid from said passage means to said control circuit, thereby keeping said control circuit charged with fluid under a pressure determined by said control means.

6. A position-responsive control as set forth in claim 1 wherein said control means is a pressure regulating valve including a flow restricting means, spring means acting on said flow restricting means to thereby regulate said flow restricting means, and a linear movable member controlling the force applied by said spring means to said flow restricting means.

7. A position-responsive control as set forth in claim 6 wherein said biasing means is a spring whose force varies as the position of the movable part of said fluid motor varies, and said spring is calibrated with said spring means whereby for each incremental movement of said linear movable member a corresponding movement of the movable part of said fluid motor will take place.

8. A position-responsive control as set forth in claim 7 wherein said passage means includes a bore provided in and extending through said main valve member, and said pilot valve means is located within said bore.

9. A position-responsive control as set forth in claim 8 wherein said pilot valve means is operative to exhaust the fluid from a selected one of said main valve areas into said control circuit as the other main valve area is being pressurized.

10. In a hydraulic system having a fluid pressure source and a hydraulic actuator including a piston slidably mounted in a chamber and a rod secured to the piston and extending from one end of the chamber, a position-responsive control for the actuator comprising: valve means connected between the source and actuator and being located in a housing at the end of the chamber opposite from the one end, the valve means including a selectively actively and neutrally positionable valve member having a pair of opposed fluid pressure receivable servo areas, passage means connecting the areas to the fluid pressure source, pilot valve means controlling the passage means and selectively movable to either side of a neutral position to pressurize the respective main valve areas, a control circuit including a pressure sensing means associated with the pilot valve means and operative to actively position the pilot valve means in response to variations of fluid pressure in the control circuit, a control means for varying the pressure in the control circuit, an opening extending through the piston and into the rod, a hollow extension on the valve housing and extending into the opening, a feedback mechanism located within the hollow extension and operatively associated with the rod, the feedback mechanism including a biasing means associated with the pilot valve means, the biasing means and pressure sensing means acting on the pilot valve means to move the same to either side of its neutral position when the forces from the pressure sensing means and biasing means are unbalanced.

11. In a hydraulic system having a fluid pressure source, a fluid reservoir, and a hydraulic actuator including a piston slidably mounted in a chamber formed by a cylinder and a rod secured to the piston and extending from one end of the cylinder, the improvement comprising: a valve housing on the end of the cylinder opposite from the one end, a valve chamber in the housing, first conduit means establishing fluid communication being the source and valve chamber, passage means establishing fluid communication between the first mentioned chamber and the valve chamber, a control circuit in the housing and including a pressure sensing means, second conduit means establishing fluid communication between the valve chamber and the control circuit, a valve member in the valve chamber and being movable to opposite sides of a neutral position to a supply position in which the first conduit means and passage means are interconnected and an exhaust position in which the passage means and second conduit means are interconnected, the pressure sensing means being operatively associated with the valve member to move the valve member in response to pressure variations in the control circuit, third conduit means establishing fluid communication between the control circuit and the reservoir, an adjustable pressure regulating means in the last mentioned means for maintaining a selected pressure in the control circuit, and a feedback means operatively connected to the piston and including a biasing means associated with the valve member and operative to neutrally position the valve member when the force from the pressure sensing means and the biasing means are in equilibrium.

References Cited

UNITED STATES PATENTS

| 2,411,748 | 11/1946 | Kelly | 91—387 |
| 2,966,891 | 1/1961 | Williams | 91—387 |
| 3,308,721 | 3/1967 | Sagawa et al. | 91—461 |

PAUL E. MASLOUSKY, Primary Examiner

U.S. Cl. X.R.

91—460, 461